Nov. 29, 1960 M. A. MEYER 2,962,675

BALANCED MODULATOR

Filed Oct. 1, 1954

INVENTOR
MAURICE A. MEYER

BY Joseph Weingarten
ATTORNEY

United States Patent Office 2,962,675 Patented Nov. 29, 1960

2,962,675

BALANCED MODULATOR

Maurice A. Meyer, Natick, Mass., assignor to Laboratory for Electronics, Inc., Boston, Mass., a corporation of Delaware Filed Oct. 1, 1954, Ser. No. 459,646

12 Claims. (Cl. 332—47)

Figure 1:
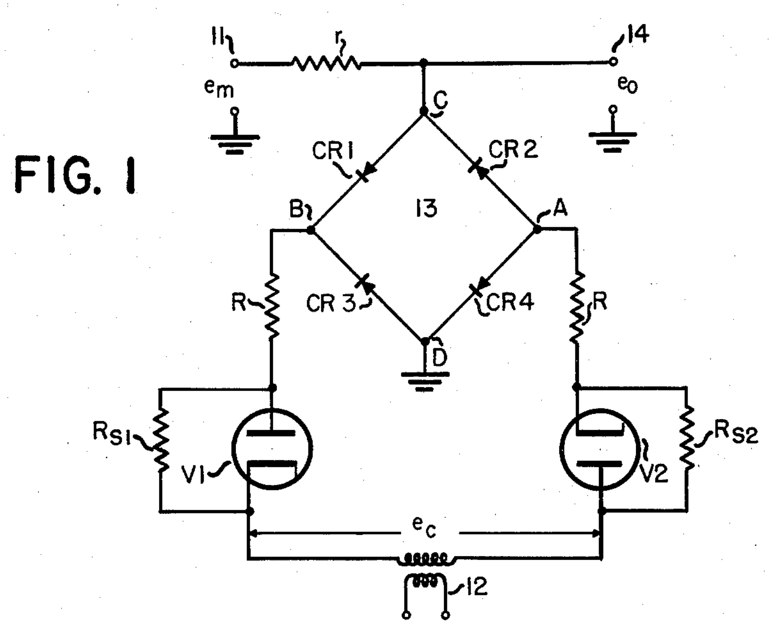

The present invention relates in general to signal modulation systems and more particularly concerns balanced modulator apparatus capable of accepting relatively high level signal inputs and offering a correspondingly high level output with balance, linearity, efficiency and undesired signal suppression to a degree heretofore unavailable.

This application represents a novel extension of the principles set forth in the copending application of Bernard M. Gordon and Maurice A. Meyer, Serial No. 337,742, filed February 19, 1954, and entitled Balanced Modulator, now Patent No. 2,799,829. To furnish background information, certain portions of the copending application have been reproduced below.

Broadly speaking, the balanced modulator is operative upon the application of carrier and modulating signals to yield sum and difference side-band frequencies in the absence of either carrier or modulating signal. This is distinguished from the more customary modulator whose output includes both input signals together with the side-band components.

Considerable effort has been directed to development in the balanced modulator art, since these circuits are highly advantageous in specialized communication and other electronic systems. As a result, many useful balanced modulator circuit configurations are in current use and are described in available texts and patents. Perhaps one of the most common and widely used balanced modulator circuits includes a four-arm rectifier bridge energized by the signals to be mixed. In analysis of its operation, the rectifier bridge may be thought of as a switch and the carrier signal as a control over the switching function. Effectively, the switch "chops" the modulating signal with a fifty percent duty cycle at the carrier frequency, which functionally is the equivalent of alternately opening and closing either input or output circuit, or shorting either to ground periodically. Spectral analysis of the output waveform shows it to contain the desired side-bands, the modulating signal and, theoretically at least, no component of the undesired carrier signal. As a practical matter, however, carrier leakage to the output occurs due to imperfect balance of the rectifier bridge arms resulting from the fact that all conducting and all non-conducting impedances of the rectifiers are not commonly precisely equal. As a matter of terminology, the conducting and non-conducting impedances of the rectifier elements are shown, and herein referred to, as the forward and back resistances, respectively.

Balanced modulators of this general description may be constructed using various rectifier types, such as vacuum diodes, semi-conductor crystals, selenium, or copper oxide elements. Each type has its advantages and limitations. With vacuum diodes, even though the forward resistance is quite low and the back resistance substantially infinite, critical balance is a difficult problem. In addition, the well-known Edison effect tends to establish undesirable circulating currents in the bridge, while relatively high interelectrode capacitances seriously limit the upper frequency. Semi-conductors are particularly advantageous from the viewpoint of long life, small size and weight, moderate cost and in the case of crystals, low shunt capacitance; but these are to a large extent offset by such less desirable characteristics as poor aging characteristics and a lack of initial uniformity, particularly insofar as forward and back resistances are concerned. Another disadvantage of semi-conductor type diodes is that when a potential which has caused conduction is removed from across the diode, the current through the diode continues to flow for a finite time after such removal of potential, and so the semi-conductor diode recovery time is said to be high compared to that of thermionic diodes. This reduces the efficiency of the modulator circuit because instead of switching the diodes off for one-half the switching cycle as is desired, the diodes are, in fact, off for somewhat less than half the switching cycle. As the switching frequency is increased, the off time of the diodes increases until a point is reached where the efficiency is so low that the modulator is unusable. For linear modulation, it is desirable that the ratio of voltage-to-current in the diode during conduction be substantially constant. This condition, of course, is not satisfied during the recovery time of the diode and so non-linear modulation is another disadvantage of semi-conductor devices in conventional circuits.

When rectifier elements of any of the types noted above are used in conventional balanced modulators, additional inherent restrictions are recognized. For example, the carrier power applied to the rectifier switch must be several times greater than the modulating signal in order to prevent distortion of the output signal. Now then, if the bridge is comprised of crystal diodes or similar low power elements, the applied carrier signal must be sufficiently small to avoid exceeding the diode dissipation capacity. In the case of crystal diodes, such as the commercially available 1N34 or 1N70, the carrier signal applied directly to the switching bridge may not be in excess of approximately two volts r.m.s., and since the modulating signal may be limited to the order of one-tenth the carrier for distortionless operation, the modulating signal input is constrained to 0.2 volt. On further analysis, it is seen that if a 0.2 volt modulating signal is used to drive a diode balanced modulator bridge, the amplitude of the desired output side-bands will be even smaller, because of the spectral distribution of signals appearing in the output. Thus, to successfully utilize a conventional balanced modulator bridge circuit even if relatively high amplitude inputs are available, it is first necessary to reduce these signals to values acceptable by the bridge, and then employ additional amplifiers and other auxiliary equipment to raise the level of the modulator output to that required by the particular system. The inefficiency and excessive cost are obvious.

Low level operation is not the sole disadvantage of the conventional bridge balanced modulator. Unbalance of the diode elements in either forward or back directions results in carrier leakage. By a process of selection, it is possible to choose diodes which are balanced in both forward and back directions. However, the aging characteristics of initially similar diodes are not alike, with the result that, in time, a hand-selected group of diodes will no longer exhibit balance, negating the advantage obtained by the time-consuming manual selection procedure.

Numerous attempts have been made to reduce leakage of carrier signal and although some of these attempts have succeeded in improving balance, they have generally done so at a sacrifice of permissible operating level. Consequently, more than the usual amplification was required at the modulator output and a reduction of the modulation linearity ensued. By ignoring for the moment the non-linear modulation and reduction of signal output, it was almost universally necessary to achieve a more acceptable degree of balance by critical, manual adjustment initially and then from time to time as the components aged.

The present invention contemplates and has as a primary object the provision of a balanced linear modulator having an intrinsically stable long life requiring no adjustment and which, further, may accept relatively high level input signals to provide an output signal of correspondingly high level with negligible carrier leakage.

It is recognized that diode switching in a balanced modulator is a voltage phenomenon. The switching carrier voltage is increased materially over that used heretofore, but means are provided to insure that the potentials applied directly to the diodes are insufficient to cause destructive dissipation therein. Although a large open circuit carrier voltage is applied to the system for switching purposes, appropriate protective impedances prevent the full switching potential from appearing across the diodes proper. By the introduction of these impedances, the carrier potential used is limited in amplitude only to values which would cause the diodes to break down on inverse voltage. This is found to be of the order of 79–100 volts for low cost crystals, and is obviously a marked improvement over the earlier permissible maximum.

The performance of the diode modulator is further enhanced by substantially perfectly balancing the carrier signal in the back direction. This is achieved in one embodiment through the use of a pair of diodes shunted by resistances of relatively high values having essentially no effect on the circuit during the forward half cycle of the applied carrier signal, but which permits switching frequency currents to flow through the shunt resistances in the back direction. By making these resistances very large, only enough carrier appears on the bridge to shut off the diodes, substantially reducing the recovery time of the diodes while maintaining a high degree of bridge balance.

This reduced diode recovery time means that the diodes are now off for substantially one-half the switching cycle. The bridge efficiency accordingly increases and modulation non-linearity is substantially reduced.

A further object of the present invention is to combine auxiliary diodes shunted by high resistances with a diode bridge to preclude carrier leakage in the back direction while increasing the bridge efficiency.

A still further object of the present invention is to provide means for operating a balanced modulator at relatively high modulating and carrier signal inputs with a minimum of distortion and carrier leakage.

Figure 2:
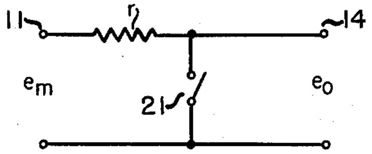
Figure 3:
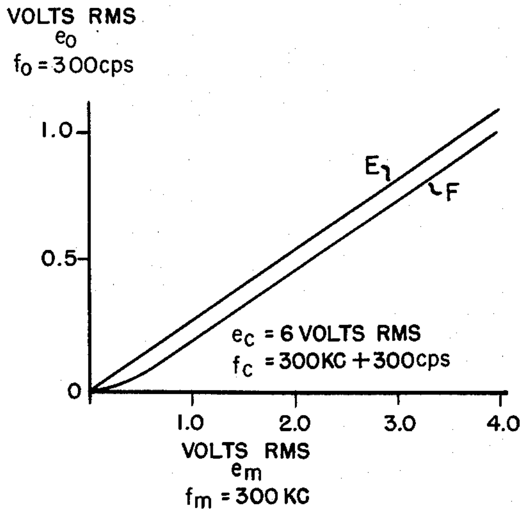

These and other objects of the present invention will now become apparent from the following detailed specification when taken in connection with the accompanying drawing in which:

Fig. 1 is a schematic circuit diagram of an embodiment of this balanced modulator, Fig. 2 is a diagrammatic representation of the function of particular circuit elements illustrated in Fig. 1, and Fig. 3 is a plot of output voltage as a function of modulating voltage to illustrate the increased linearity and efficiency obtained with the invention.

With reference now to the drawing and more particularly to Fig. 1 thereof, there is illustrated a balanced modulator having an input terminal 11 for the application of the modulating signal $e_m$ and an input transformer 12 for the application of a carrier signal. The carrier signal as it appears across the secondary of transformer 12, is of particular interest here since it is the true input, and is designated as $e_c$.

Modulating signal $e_m$ is coupled through an input resistor $r$ to bridge 13 comprised of four crystal diodes CR–1, CR–2, CR–3, and CR–4 poled to conduct in series pairs from point A to point B using conventional current flow designation, as distinguished from electron flow. Junction C between diodes CR–1 and CR–2 is connected to the input resistor and to terminal 14 where the output signal $e_o$ is derived. Junction D between diodes CR–3 and CR–4 is a grounded reference point. Carrier $e_c$ is applied to the bridge between junctions A and B through a pair of substantially equal resistors R, the function of which will be described in considerable detail below.

Arbitrarily, assuming the absence of modulating signal $e_m$, on each half cycle of carrier $e_c$ where point A is positive and point B is negative, all four diodes will conduct. Under these circumstances, point C of the diode bridge is returned to ground through two parallel pairs of conductive diodes. If all four forward resistances are precisely equal, or if the forward resistance of CR–2 is equal to that of CR–4 while at the same time the forward resistances of CR–1 and CR–3 are equal, then a balanced condition obtains, and point C, like point D, will be at ground potential. Hence, terminal 14 will be at ground potential and no carrier leakage exists (other than that which is transferred by any unbalance in the relatively small shunt capacities).

If the forward resistances are all equal, then the impedance from point C to ground will be that of a single conducting diode. When the carrier signal reverses in polarity such that points A and B are negative and positive, respectively, then the diodes are non-conducting and the effective resistance between point C and ground is equal to the back resistance of a single non-conducting diode, if all back resistances are roughly equal.

Fig. 2 illustrates in elementary fashion the principles which govern the modulation process. Here, the rectifier bridge is replaced by a switch 21, and for purposes of simulating the effect of the carrier signal $e_c$, the switch 21 may be considered as operating at a frequency equal to that of the carrier with a fifty percent duty cycle. Closing the switch shorts the modulating signal to ground through input resistor $r$, while opening the switch connects the modulating signal directly to the output terminal.

In a conventional balanced modulator without resistances R as disclosed in Fig. 1, the carrier signal would be applied directly to points A and B. For commercially available crystals, a two volt amplitude limitation would be imposed, since additional signal would cause failure of the diodes as noted earlier.

In Fig. 1, when the applied carrier voltage is such as to make points A and B positive and negative, respectively, diode conduction takes place but the voltage appearing between points A and B is less than the carrier voltage by a factor equal to the forward resistance of a single diode divided by 2R. Since the forward resistance of a diode is small, the carrier signal may be raised considerably in level before the voltage on the diodes exceeds the premissible level. There is, in fact, very little limitation on the magnitude of the carrier $e_c$ when considering only the forward direction because resistors R may be selected at a value sufficiently high to reduce the signal between points A and B to a safe value.

It is, however, necessary to consider the effect of the reverse half cycle of the carrier. Since the back resistance of a diode is relatively high, little inverse current flows in the diodes and substantially the full carrier voltage appears between points A and B. Consequently, the diodes would break down if this signal were in excess of the rated back voltage thereof. Thus, the maximum carrier $e_c$ which may be applied is that which is safe from the point of view of back voltage for the crystal type used. The resistors R may be then chosen to permit no more than a safe current magnitude in the forward direction. By applying a portion of this negative voltage on the reverse half cycle to the bridge through shunt resistors $R_{S1}$ and $R_{S2}$, the bridge diodes are rapidly switched off, appreciably reducing their recovery time.

It is at once evident that the acceptable carrier voltage level has been raised materially by this arrangement. The possible magnitude of modulating signal $e_m$ is limited, aside from considerations of distortion, to some value less than the carrier $e_c$ to prevent reversal of polarity at point C, which would cut off switch operation. Because of the decreased diode recovery time in the novel modulator shown in Fig. 1, the power relations in existence by virtue of resistors R make it possible to raise the level of $e_m$ to slightly less than $e_c$, so that two high level signals may be employed without adversely affecting the modulation process, and limitations due to considerations of distortion are reduced because of decreased diode recovery time.

Examining the effects of resistors R, it is seen that in the forward direction, a marked degree of balance improvement is obtained because only a small fraction of the carrier appears at points A and B. That is, for a rather large possible increase in applied carrier and modulating signal, and for an equally large output, no more carrier voltage appears on the bridge than in conventional balanced modulators. Since the absolute magnitude of carrier leakage to the output for a given degree of bridge unbalance is determined by the magnitude of the carrier signal available at the bridge itself, the introduction of resistors R materially improves balance while raising allowable signal levels.

But the balance improvement discussed above is primarily realizable only in the forward direction. Resistors R do not materially aid in improving the balance in the back direction, inasmuch as the back resistance of the diodes is much higher than resistors R. It will hence be of assistance if the rectifiers are initially balanced in the forward and back directions. However, it has been observed that if a diode bridge is composed of crystal rectifiers which are initially balanced, this balance is more apt to be retained during aging in the forward direction, but does not so remain in the back direction. Thus, in time, a select rectifier grouping used in the modulator shown in Fig. 1 may develop a degree of unbalance which will contribute carrier leakage. Relative balance may be improved somewhat by shunting equal high resistors across the bridge diodes to minimize the electrical effect of back resistance characteristics variation; however, it is obvious that although an improvement in relative balance may be obtained, lower efficiency is a result.

In Fig. 1, when the carrier potential applied is of polarity such that points A and B are positive and negative, respectively, the hard tube diodes V1, V2 are of little consequence, since their conductive resistances are quite low, and the operation of the balanced modulator is substantially identical to that already described for the forward direction. However, in the back direction, the hard tube diodes are non-conductive and are of essentially infinite resistance relative to the shunt resistances $R_{S1}$ and $R_{S2}$. $R_{S1}$ and $R_{S2}$ are sufficiently low to permit enough carrier to be applied to the bridge during the "back" half-cycle to shut off the bridge diodes, but are sufficiently large so that when the latter diodes are cut off, the back resistances of the diodes are small compared to $R_{S1}$ and $R_{S2}$. Thus the balance of the bridge is not disturbed by variations in the back resistances of the crystal diodes, the diodes are rapidly switched off, and still negligible carrier appears at points A and B because of the relatively high resistance of shunt resistances $R_{S1}$ and $R_{S2}$ with respect to the back resistances of the bridge diodes. Thus, resistors R minimize carrier leakage in the forward direction, and tubes V1 and V2 shunted by $R_{S1}$ and $R_{S2}$ preclude any substantial leakage in the back direction.

If it is desired to switch the bridge with relatively low-level signals and have an extremely high degree of linearity, the shunt resistances across the hard diodes may be reduced to a point where the magnitude of one of these resistances is of the order of the magnitude of a bridge-diode static back resistance. Such an arrangement results in some increase in leakage of the switching voltage through the bridge, but this leakage is still considerably less than that in conventional balanced modulators utilizing crystal diodes.

Fig. 3 shows a plot of A.-C. voltage at terminal 14 as a function of A.-C. voltage into transformer 12. Curve F is taken without resistors $R_{S1}$ and $R_{S2}$ across V1 or V2; curve E is with resistors $R_{S1}$ and $R_{S2}$ in the circuit. Note the increased output voltage with the one megohm resistors across diodes V1 and V2 and the improvement in linearity. These results are most noticeable at low levels and make the modulator extremely useful as a multiplier, modulator, or demodulator when low-level signals are to be mixed, and in no way detract from its utility when mixing high level signals.

These results were obtained from a modulator constructed in accordance with Fig. 1 wherein:

| | |
|---|---|
| $r$ | 5,100 ohms. |
| R | 2,200 ohms. |
| $R_{S1}$, $R_{S2}$ | 1 megohm. |
| CR–1, CR–2, CR–3, CR–4 | 1N34A crystal diodes. |
| **V1** and **V2** | 5829 twin-diode tube. |
| Modulating voltage $e_m$ at frequency $f_m$ | 300 kc. |
| Carrier voltage $e_c$ | 6 volts R.M.S. |
| At frequency $f_c$ | 300 kc.+300 c.p.s. |
| Output voltage $e_o$ at frequency $f_0$ | 300 c.p.s. |

Although Fig. 1 discloses the use of two hard tube auxiliary diodes V1 and V2, similarly poled rapid-switching semi-conductor diodes may be substituted therefor, as long as the rapidly switched back-resistances of these diodes is greater than shunt resistors $R_{S1}$ and $R_{S2}$, when using hard diodes. When shunt resistors are placed across a semi-conductor diode, these are selected so that the parallel combination of the resistor and the back resistance of the diode equals the shunt resistance when used across a hard diode.

The techniques herein disclosed for improving the balance, linearity, and efficiency of bridge modulators are applicable, not only in the specific emobdiments illustrated, but apply equally well to numerous other designs. In Fig. 1 the diode switch shunts the output as is illustrated in Fig. 2. In a series switch modulator, the positions of resistor $r$ and switch 21 in Fig. 2 are simply interchanged. Where the diode bridge is a series switch, the principles shown in Fig. 1 may still be employed. Complex circuits, such as the one known as the double balanced bridge, are also readily modified to achieve the benefits noted hereinabove.

In view of the fact, therefore, that numerous modifications and departures may now be made by those skilled in this electrical art, the invention herein is to be construed as limited only by the spirit and scope of the appended claims.

What is claimed is:

1. A balanced modulator for mixing input and switching electrical signals comprising, a semi-conductor diode bridge, means for applying said input signal to said bridge, means including a resistively shunted electron tube rectifier element for symmetrically coupling said switching signal to said bridge, and means for deriving an output signal from said bridge.

2. A balanced modulator for mixing input and switching electrical signals comprising, a semi-conductor diode bridge, means for applying said input signal to said bridge, and means including the series combination of an impedance element and a resistively shunted electron tube rectifier for coupling said switching signal to said bridge.

3. A balanced modulator for mixing first and second electrical signals comprising, a semi-conductor diode bridge having relatively low and high forward and back impedances respectively, means for applying said first signal to said bridge, means including dual rectifier circuits for applying said second signal to said bridge, each of said rectifier circuits each comprising a resistively shunted hard tube for coupling a relatively large fraction of said second signal of one polarity and a relatively small fraction of said second signal of opposite polarity, respectively, to said bridge for substantially accelerating the transition from forward to back conduction in said semi-conductor bridge diodes.

4. Apparatus as in claim 3 wherein each of said rectifier circuits includes a relatively low resistance in series with an electron tube diode and a relatively high resistance in parallel with said diode.

5. A balanced modulator for mixing modulating and carrier signals comprising, a four-arm semi-conductor rectifier bridge having first and second pairs of opposed junctions, said rectifiers being arranged for conduction in two parallel paths between said first pair of junctions, means for applying said modulating signal to said second pair of junctions, a pair of coupling networks each having one terminal joined to a respective one of said first pair of junctions, and means for applying said carrier signal symmetrically to the opposite terminals of said coupling networks, each of said coupling networks including a resistor in series with a resistively shunted electron tube hard diode.

6. A balanced modulator for mixing modulating and carrier signals comprising, a semi-conductor crystal diode bridge energized by said signals, two rectifier elements each having a forward resistance low relative to that of said crystal diodes and having a substantially infinite back resistance for non-uniformly applying adjacent portions of opposite polarity of one of said signals to said bridge during alternate half cycles thereof, and a relatively high resistance shunting each of said rectifier elements.

7. A balanced modulator for mixing modulating and carrier signals comprising, a four-arm semi-conductor rectifier bridge having first and second pairs of opposed junctions, the bridge rectifiers being arranged for conduction in two parallel paths between said first pair of junctions, means including a series impedance element for coupling said modulating signal to said second pair of junctions, first and second resistors each having an end joined to a respective one of said first pair of junctions, each of said resistors substantially exceeding the value of the conductive resistance of each of said semi-conductive rectifiers, first and second rectifying elements each having relatively low resistance during conduction and substantially infinite non-conducting resistance, third and fourth relatively high resistances shunting said first and second rectifying elements respectively, said first and second rectifying elements being coupled respectively to the ends of said first and second resistors opposite those ends coupled to said second pair of junctions and being poled for conduction in the direction of conduction through said semi-conductor rectifiers, and means for symmetrically applying said carrier signal to said first and second rectifying elements at the ends opposite their junction with said first and second resistors.

8. Apparatus as in claim 7 wherein said first and second rectifying elements are thermionic diodes.

9. Apparatus as in claim 7 wherein said first and second rectifying elements are semi-conductor diodes.

10. Electrical apparatus comprising a source of a switching signal, a semi-conductor device, impedance shunted electron tube coupling means for symmetrically applying said switching signal to said semi-conductor device to render it conductive and non-conductive, said coupling means having the characteristic of presenting a relatively high but less than infinite impedance to switching signal potentials of one polarity and a relatively low impedance to switching signal potentials of the opposite polarity, the time required for change from low to high impedance in said coupling means in response to a change in switching signal polarity being shorter than the time required for the semi-conductor device to return to the non-conductive state from prior conduction, whereby return of said semi-conductor device to a non-conductive state is accelerated upon change in polarity of said switching signal as applied to said coupling means.

11. A balanced modulator for mixing first and second electrical signals comprising, a semi-conductor diode bridge, means for applying said first signal to said bridge, and symmetrically circuit portions each including the series combination of an impedance element and a resistively shunted electron tube rectifier for symmetrically coupling said second signal to said bridge.

12. A balanced modulator for mixing first and second electrical signals comprising, a semi-conductor diode bridge, means for applying said first signal to said bridge, means including a pair of resistively shunted hard tube rectifiers for symmetrically applying said second signal to said bridge, first polarity portions of said second signal being applied to render the bridge diodes conductive, opposite polarity portions of said second signal being applied in attenuated form to accelerate the return of said bridge diodes to the non-conductive state.

References Cited in the file of this patent

UNITED STATES PATENTS

| | | |
|---|---|---|
| 2,293,628 | Reiling | Aug. 18, 1942 |
| 2,682,640 | Harling | June 29, 1954 |
| 2,799,829 | Gordon et al. | July 16, 1957 |

UNITED STATES PATENT OFFICE

CERTIFICATION OF CORRECTION

Patent No. 2,962,675 November 29, 1960

Maurice A. Meyer

It is hereby certified that error appears in the above numbered patent requiring correction and that the said Letters Patent should read as corrected below.

Column 3, line 4, for "By" read -- But --; line 28, for "79" read -- 70 --; column 8, line 36, for "symmetrically" read -- symmetrical --.

Signed and sealed this 9th day of May 1961.

(SEAL)
Attest:

ERNEST W. SWIDER
Attesting Officer

DAVID L. LADD
Commissioner of Patents